C. A. WILSON.
STALK CUTTER.
APPLICATION FILED AUG. 20, 1910.
988,844.
Patented Apr. 4, 1911.
2 SHEETS—SHEET 2.
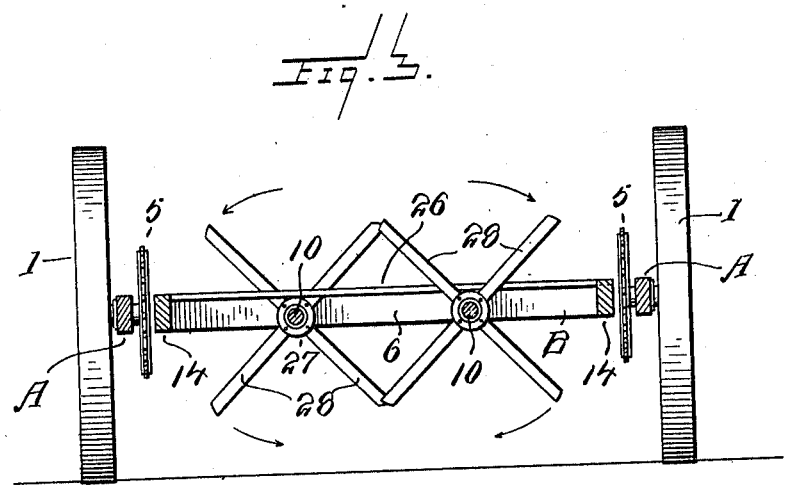
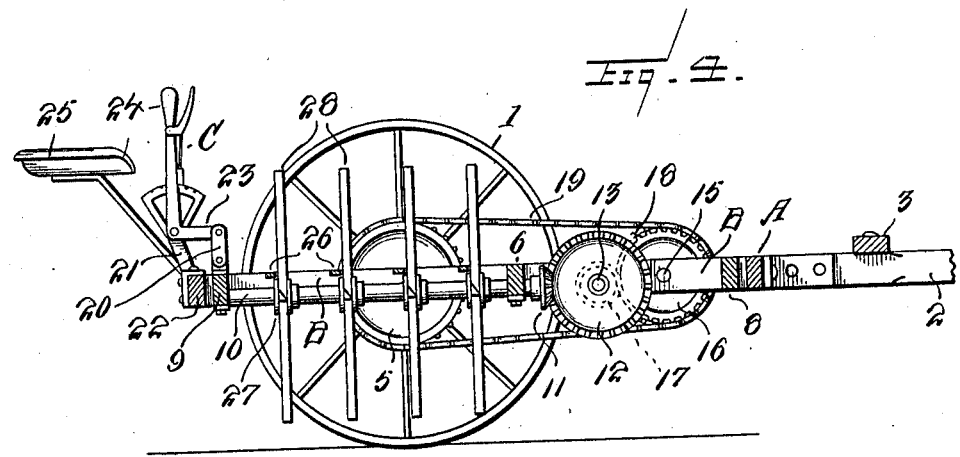
Inventor
Charles A. Wilson
By Victor J. Evans
Attorney
Witnesses
E. R. Ruppert.
Wm F. Bagger.

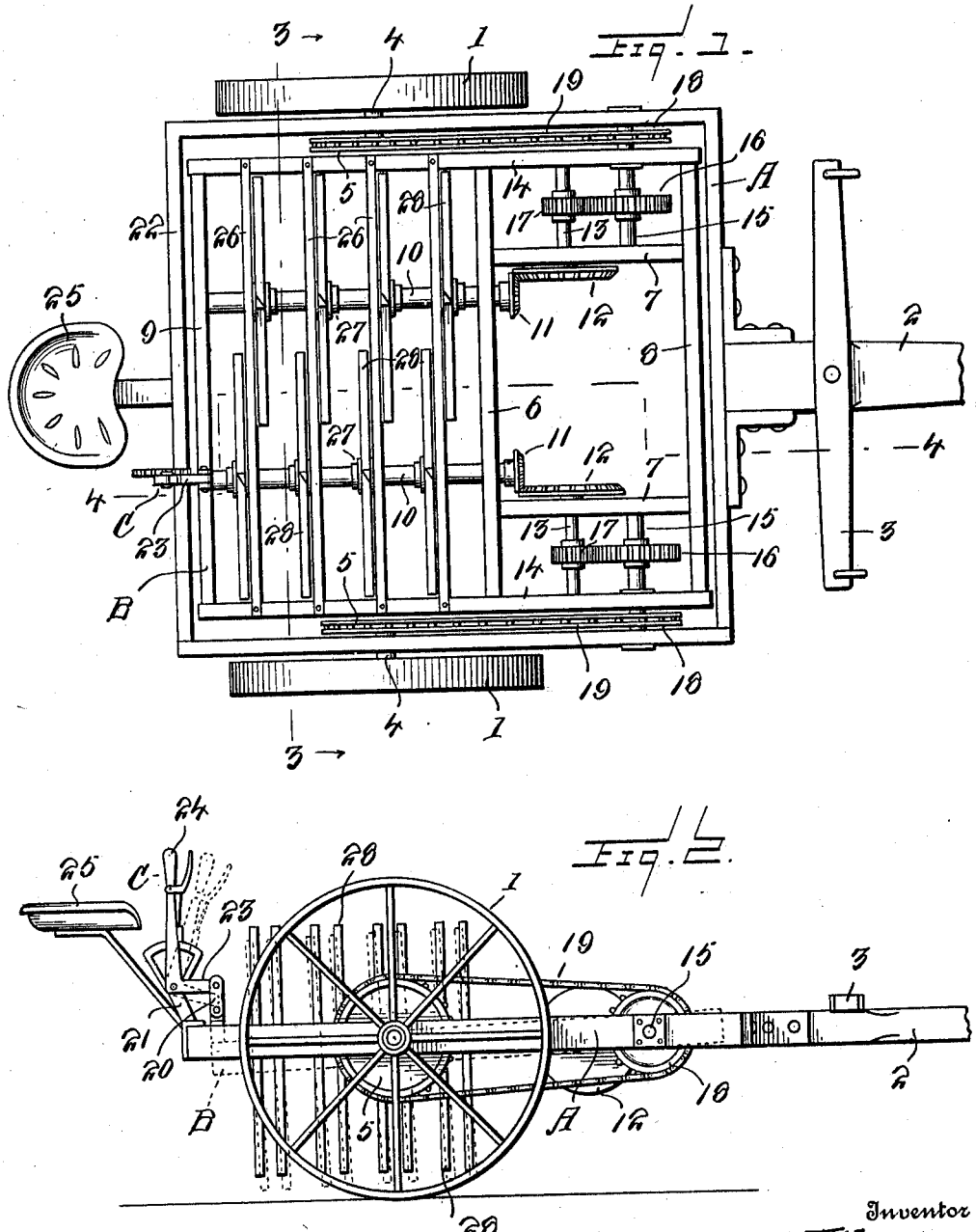

UNITED STATES PATENT OFFICE.

CHARLES A. WILSON, OF NEODESHA, KANSAS.

STALK-CUTTER.

988,844.  Specification of Letters Patent.  Patented Apr. 4, 1911.

Application filed August 20, 1910. Serial No. 578,111.

*To all whom it may concern:*

Be it known that I, CHARLES A. WILSON, a citizen of the United States of America, residing at Neodesha, in the county of Wilson and State of Kansas, have invented new and useful Improvements in Stalk-Cutters, of which the following is a specification.

This invention relates to stalk cutters, and it has for its object to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a side elevation of the same. Fig. 3 is a vertical transverse sectional view taken on the plane indicated by the line 3—3 in Fig. 1. Fig. 4 is a longitudinal vertical sectional view taken on the plane indicated by the line 4—4 in Fig. 1.

Corresponding parts in the several figures are denoted by like characters of reference.

The improved stalk chopper includes a rectangular main frame A which is supported upon ground wheels 1, 1 and with the forward end of which the tongue or draft pole 2 is suitably connected, said pole being provided with an evener 3 for the attachment of the draft. The spindles or stub axles 4 carrying the ground wheels 1, 1 are extended inwardly through the frame, and are provided with sprocket wheels 5.

B is an inner movable frame which is rectangular in shape and of such dimensions as to be capable of swinging within the outer or main frame A.

The auxiliary frame B is provided intermediate its front and rear ends with a cross bar 6 which is connected by braces 7 with the front cross bar 8 of said frame B. The cross bar 6 and the rear cross bar or member 9 of the frame B afford bearings for two longitudinal shafts 10 which are disposed in parallel relation, each of such shafts being provided at its front end, which extends through the cross bar 6, with a bevel pinion 11. The bevel pinions 11 mesh with bevel gears 12 upon shafts 13 which are suitably supported for rotation in bearings upon the braces 7 and the side members 14 of the frame B. Said side members and braces are provided with additional bearings for shafts 15 disposed in parallel relation to the shafts 13 with which they are connected by intermeshing gears 16, 17. The shafts 15 extend through the side members 14, and their projecting ends are provided with sprocket wheels 18 connected by chains 19 with the sprocket wheels 5 upon the spindles 4, which latter are mounted for rotation in the side members of the frames A and B, and serve to pivotally support the latter frame.

For the adjustment of the auxiliary frame there is provided a bell crank lever C which is fulcrumed upon a bracket 21 extending upwardly from the rear cross bar 22 of the frame A, one arm 23 of said bell crank being connected by a link 20 with the rear cross bar of the auxiliary frame B; the other arm of the lever C is extended upwardly, as shown at 24, to form a hand lever in convenient proximity to the driver or operator whose seat 25 is likewise supported upon the rear cross bar 22 of the frame A.

Rotary motion will be transmitted from the spindles 4 to the shafts 10, said rotary motion being transmitted without regard to the position to which the frame B may be tilted with reference to the main frame or carrying frame A.

The auxiliary frame B is provided intermediate the cross bar 6 and the rear cross bar 9 with a plurality of transverse bars or members 26 connecting the side members 14, said transverse or cross bars 26 being designed to form cutter bars. Each of the shafts 10 is provided with a plurality of hubs 27, each of said hubs being equipped with a plurality of, preferably four, radially extending knives or cutting members 28, said cutting members being preferably so distributed that those extending from the hubs 27 of one shaft 10 will be directly in front of the cutter bars 26, while those connected with the hubs upon the other shaft 10 will be directly in rear of the cutter bars.

When the machine is in operation, the arms or members constituting the knives or cutters 28 extending from the two shafts 10, 10 will be rotated toward each other, the arms connected with each shaft being arranged to move from the top outwardly, downwardly, inwardly and upwardly, as indicated by the darts or arrows in Fig. 3 of the drawings. The arms or cutters will thus take up the stalks from the ground and lift them upwardly into engagement with the cutter bars 26, where they are held securely while being severed by the knives or cutters 28 into small bits, the length of which will be governed by the distance between the cutter bars 26. The operation of the machine is continuous, and the stalks lying in the path of the machine will be swept up by the arms or knives to be chopped into bits by the joint action of the knives and the cutter bars.

This improved stalk chopper may be usefully employed for chopping corn stalks, cotton stalks and the like. It is simple in construction, durable and efficient in operation.

Having thus described the invention, what is claimed as new, is:—

1. In a stalk cutting machine, a carrying frame, a movably supported auxiliary frame, longitudinally disposed shafts supported for rotation in the auxiliary frame, transversely disposed cutter bars in said auxiliary frame, cutters radiating from one shaft and disposed adjacent to the front sides of the cutter bars, and knives radiating from the other shaft and disposed adjacent to the rear sides of the cutter bars.

2. In a stalk cutting machine, a carrying frame, a movably supported auxiliary frame having a plurality of transversely disposed cutter bars, a pair of longitudinal shafts supported for rotation in the auxiliary frame, knives radiating from said shafts and coöperating with the cutter bars, and means for imparting rotary motion in opposite directions to the knife carrying shafts.

3. In a stalk cutting machine, a carrying frame having spindles supported for rotation and equipped with ground wheels, a pivotally supported auxiliary frame, lever means for tilting and adjusting the auxiliary frame, transversely disposed cutter bars in said auxiliary frame, longitudinal shafts intersecting the cutter bars and supported for rotation, knives radiating from the shafts and coöperating with the cutter bars, and means for transmitting motion from the wheel carrying spindles to the knife carrying shafts.

In testimony whereof I affix my signature in presence of two witnesses.

CHARLES A. WILSON.

Witnesses:
C. A. WALKER,
JOHN I. KIMBALL.

---

Copies of this patent may be obtained for five cents each, by addressing the "Commissioner of Patents, Washington, D. C."